United States Patent [19]

Bake et al.

[11] 4,171,711

[45] Oct. 23, 1979

[54] PLUG VALVE CONSTRUCTION

[75] Inventors: Earl A. Bake, Pittsburgh; E. Frederick Schoeneweis, Coraopolis, both of Pa.

[73] Assignee: Rockwell International Corporation, Pittsburgh, Pa.

[21] Appl. No.: 861,248

[22] Filed: Dec. 16, 1977

Related U.S. Application Data

[62] Division of Ser. No. 636,873, Dec. 2, 1975, abandoned.

[51] Int. Cl.$^2$ .................. F16K 23/00; F16K 5/04
[52] U.S. Cl. .................. 137/312; 137/852; 251/309; 251/317; 251/283
[58] Field of Search ............... 137/843, 849, 859, 860, 137/312, 854, 852; 138/89; 220/89 A, 209, 266; 251/214, 283, 309, 310, 311, 312, 313, 314, 315, 316, 317; 277/170

[56] References Cited

U.S. PATENT DOCUMENTS

| | | | |
|---|---|---|---|
| 931,155 | 8/1909 | Smith | 137/312 |
| 2,151,596 | 3/1939 | Halle | 137/312 |
| 2,190,827 | 2/1940 | Deeley | 220/209 |
| 2,493,966 | 1/1950 | Hartley | 251/312 |
| 2,644,978 | 7/1953 | Becker | 138/89 |
| 2,738,158 | 3/1956 | Fuglie | 251/309 |
| 2,864,580 | 12/1958 | Lemoine | 251/317 |
| 3,350,057 | 10/1967 | Luckenbill | 251/312 |
| 3,574,312 | 4/1971 | Miller | 138/89 |
| 3,578,027 | 5/1971 | Zopfi | 138/89 |
| 3,578,467 | 5/1971 | Huber | 220/209 |
| 3,802,457 | 4/1974 | Wurzburger | 251/309 |
| 3,954,118 | 5/1976 | Wilcox | 220/89 A |

FOREIGN PATENT DOCUMENTS

2028337 6/1970 Fed. Rep. of Germany .......... 251/309
698991 10/1953 United Kingdom .................... 251/314

*Primary Examiner*—William R. Cline
*Assistant Examiner*—H. Jay Spiegel

[57] ABSTRACT

An improved plug valve is of the type that includes a valve body having a bore extending therethrough and a pair of passages intersecting the bore and being substantially normal to the axis of the bore. A valve plug is disposed within the bore for selective rotation between an opened and a closed position to respectively align and misalign a port through the plug with the passages. A first circumferential sealing member between the plug and the bore above the port and the passages and a second circumferential sealing member between the plug and the bore below the port prevents fluid from escaping from an interior of the plug valve and balances fluid pressure acting on the plug. The improvements include providing opposed circumferential semi-circular grooves respectively on the bore and the plug to define a circumferential channel therebetween. The body includes a circular hole extending therethrough which is tangentially aligned with the channel. A flexible rod extends through the hole and around the channel for retention of the plug within the bore. A bottom insert is fitted within the bore to enclose the base of the plug within the body and allows fluid to escape from below the plug if the second sealing member should fail. A circumferential sealing device around the top of the plug prevents ingress of foreign matter into the region of the bore above the first sealing member.

1 Claim, 2 Drawing Figures

PLUG VALVE CONSTRUCTION

This is a division of application Ser. No. 636,873, filed Dec. 2, 1975, now abandoned.

BACKGROUND OF THE INVENTION

1. Field of the Invention

This invention relates to the construction of a plug valve and, more specifically, to a means for retaining the rotatable plug within the body of the valve and for preventing ingress of dirt or liquid into the interior of the valve.

2. Description of the Prior Art

There have heretofore been utilized a number of types of plastic plug valves for use in the gas distribution piping field. These valves are commonly buried underground and exposed to ground water and dirt which could interfere with valve operation. Some valve configurations such as those disclosed in U.S. Pat. Nos. 2,505,270, 2,604,293, 2,844,353, 3,103,948 and 3,133,723 are not suited for this environment because the base of the rotatable plug is exposed and could become jammed, preventing its rotation.

While some sealing at the bottom of the body is needed, those found in U.S. Pat. Nos. 2,493,966, 3,066,908 and 3,687,416 either complicate body or plug formation or are relatively expensive to provide. Further, although these valves are purportedly balanced by sealing rings around the plug above and below the flow passages, if the lower seal were to fail, having a pressure-tight area below the plug could present a problem. Fluid pressure could act on the base of the plug to force it from the body or cause it to bind interferring with rotation. This condition is explained in U.S. Pat. No. 3,350,057 which discloses a valve which is, by design, unbalanced. Retention of the plug within the body against the axial force created by the pressure buildup within a closed bottom of the body necessitates the use of a sturdy thrust washer and associated support structure.

It can also be seen from the various prior art balanced plug valves discussed above that there are a number of varied and complex configurations employed to provide a means for retaining the plug against axial movement within the body. Retention is obtained in these valves by enclosing the top and bottom of the body; entrapping a top enclosure between the plug and the handle; extending a set screw or pin into an aligned circumferential groove; using a pair of snap rings at the exposed top and bottom of the plug; or threading the plug into the bottom of the body.

SUMMARY OF THE INVENTION

It is an object of this invention to provide an improved plug valve having a simple, reliable means for retaining the plug within the body of the plug valve to resist axial movement thereof.

It is another object to provide an improved plug valve having a means for enclosing the base of the plug within the body while allowing the escape of fluid pressure from beneath the plug in the bore which might result if sealing below the passages should fail.

It is yet another object to provide an improved plug valve having sealing around the plug which prevents the ingress of foreign material into the top of the bore.

These and other objects are provided in a preferred embodiment in the form of an improved plug valve of the type which includes a valve body having a bore extending therethrough and a pair of passages intersecting the bore and being substantially normal thereto. A valve plug is disposed within the bore for selective rotation between an opened and a closed position to respectively align and misalign a port through the plug with the passages. A first circumferential sealing means between the plug and bore above the port and the passages and a second circumferential sealing means between the plug and the bore below the port and the passages prevent fluid from escaping from an interior of the plug valve and balanced fluid pressure acting on the plug. The improvement includes the bore having a first circumferential semi-circular groove formed in the interior surface thereof. The plug has an opposed circumferential semi-circular groove formed in the outer surface thereof so that the grooves defined a circumferential channel between the plug and the bore. The body has a hole extending therethrough and tangentially aligned with the channel for receipt of a flexible rod for extension therethrough and circumferentially around the channel. A bottom insert is installed within the bore below the plug to enclose the base of the plug within the body. The bottom insert includes means for limiting the fluid pressure acting on the base of the plug if the second sealing means should fail. A circumferential sealing device around the plug prevents the ingress of foreign material into the bore above the first circumferential sealing means. A method for making the improved plug valve is also provided.

DETAILED DESCRIPTION OF THE PREFERRED EMBODIMENT

Figure 1:
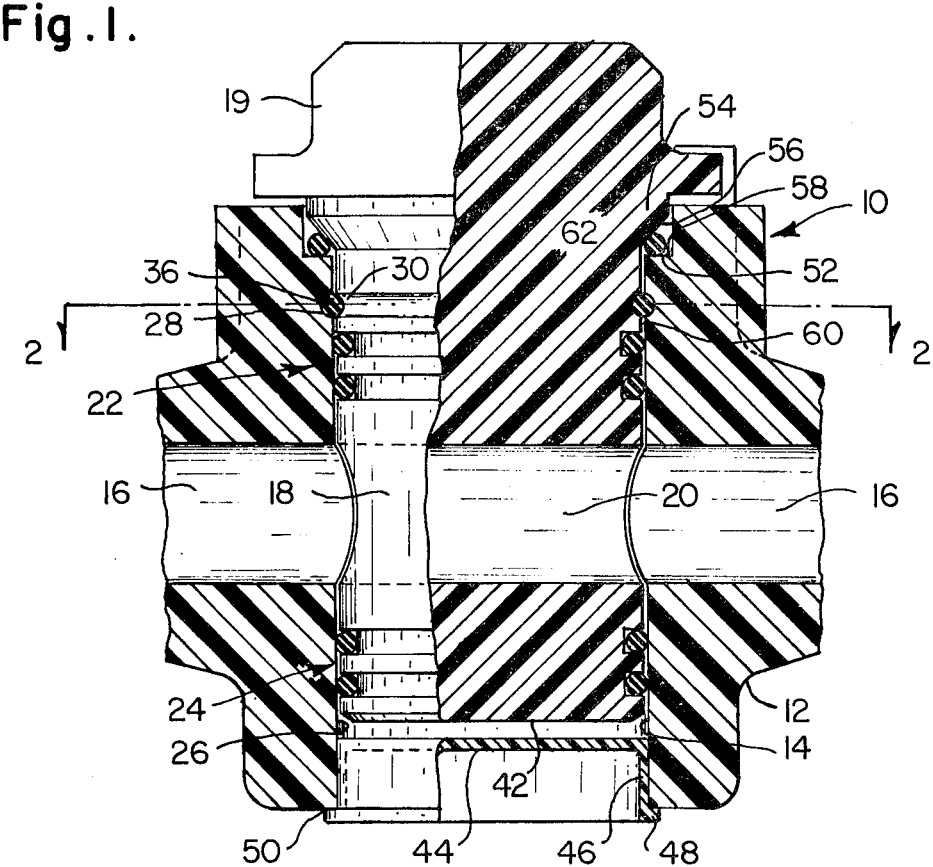
FIG. 1 is a fragmentary sectional side view of the preferred plug valve including various features of the invention.

As seen in FIG. 1, an improved plug valve 10, including various features of the invention, includes a valve body 12 having a bore 14 extending therethrough. A pair of flow passages 16 of the body 12 intersect the bore 14 and are substantially normal to its axis. A valve plug 18 is disposed within the bore 14 for selective rotation by a handle 19 between an opened and a closed position to respectively align and misalign a port 20 through the plug 18 with the passages 16. The plug valve 10 further includes first circumferential sealing means 22 between the plug 18 and the port 14 above the port 20 and passages 16 and second circumferential sealing means 24 therebetween below the port 20 and passages 16. In the preferred embodiment, each sealing means 22, 24 includes a pair of resiliently deformable sealing rings located in grooves around the plug 18 to make contact with the interior surface 26 of the bore 14. The sealing means 22 and 24 are provided to prevent fluid from escaping from the interior of the plug valve 10 and to balance fluid pressure acting on the plug 18.

Figure 2:
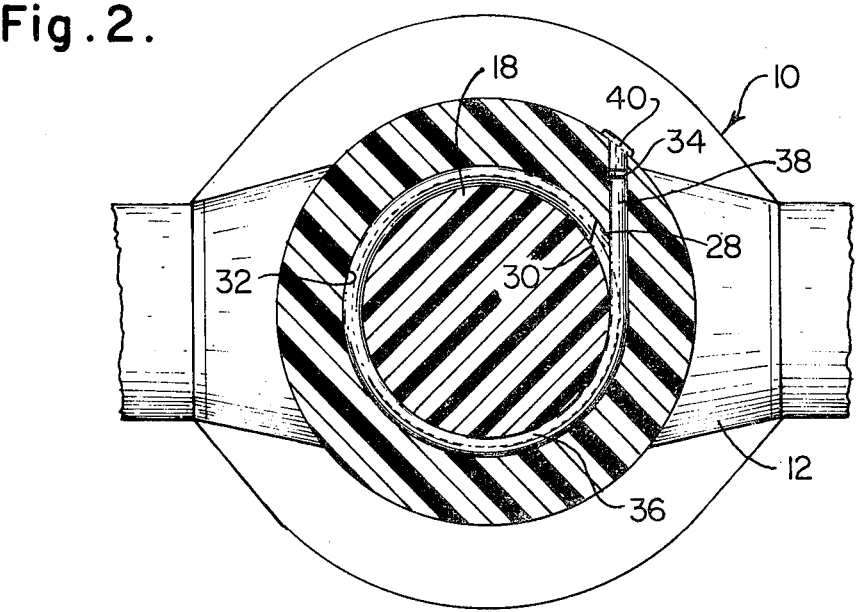
FIG. 2 is a view of the plug valve of FIG. 1 as seen along line 2—2.

To retain the plug 18 within the bore 14, a first circumferential semi-circular groove 28 is formed in the interior surface 26 of the bore 14. An opposed circumferential semi-circular groove 30 is also formed in the outer surface of the plug 18 so that the groove 28 and the groove 30 defined a circumferential channel 32 between the plug 18 and the bore 14, as best seen in FIG. 2. The body 12 is provided a circular hole 34 extending therethrough which is tangentially aligned with the channel 32. Retention is actually obtained by inserting a flexible rod 36, which loosely conforms in cross section to the channel 32, into the hole 34 and circumferentially around the channel 32. As the rod 36 makes contact between the plug 18 and the bore 14, axial movement of the plug 18 with respect to the bore 14 is prevented.

Although this method of retention is similar to the pipe coupling means shown in U.S. Pat. Nos. 2,597,482, 3,606,402 and 3,759,553, the present configuration is particularly adapted to insure that the plug 18 is free to rotate within the bore 14 for proper operation of the valve 10. Since the preferred plug valve 10 includes a plug 18 and body 12 formed of plastic material, the rod 36 can also appropriately be formed of plastic. It should be kept in mind, however, that the preferred configuration discussed hereinabove might also be utilized in metal valves and/or the rod 36 might alternatively be formed of metal. However, in the preferred plastic configuration, an end 38 of the plastic rod 36 is located interiorly of the hole 34. To maintain the integrity of the valve body 12, heat could be applied to the end 38 to cause it to fuse with the body 12, thus sealing the hole 34. Preferably, rather than direct sealing with the end 38, a sealing plug 40 is utilized. After the rod 36 is installed with the end 38 at an intermediate location within the hole 34, the sealing plug 40 is inserted in the hole 34 and heat fused to the body 12 to retain the rod 36 therein while sealing the hole 34.

It is also desirable to provide the valve 10 with a means for enclosing the base 42 of the plug 18 within the body 12 to insure proper operation of the valve when it is installed underground. A plastic bottom insert 44 is provided for this purpose to be snuggly fitted within the bore 14 below the plug 18. The bottom insert 44 is also designed to limit the fluid pressure which can act on the base 42 of the plug 18 if the second sealing means 24 should fail. Otherwise, failure of the second sealing means 24 might allow fluid pressure to act on the base 42 of the plug 18 to overcome the restraining effect of the rod 36 and axially force the plug 18 from the bore 14. Limiting fluid pressure at the base 42 while enclosing the base 42 is accomplished by providing the bottom insert 44 with a plastic tubular extension 46 which depends along the interior surface 26 of the bore 14 and is slightly flared outwardly to make resilient contact therewith. If fluid pressure above the bottom insert 44 were to increase, leakage around tubular extension 46 would allow its escape.

To properly locate the bottom insert 44 within the bore 14 by limiting the amount of insertion therein, the tubular extension 46 is provided, at its lower periphery, an outwardly extending shoulder 48 which is aligned to make contact with the body 12 around the bore 14. To insure the bottom insert 44 will be retained within the bore 14 against accidental withdrawal, the lower periphery of the tubular extension 46 is joined to the body 12 around the bore 14 at a plurality of circumferentially spaced locations 50. The locations are properly separated to insure relief of fluid pressure by movement of the tubular extension 46 if required.

It is also desirable to prevent fluid pressure at the top of the valve 10 and to prevent the ingress of foreign material into the bore 4 from the top. Accordingly, the improved plug valve 10 includes a simplified, less complicated sealing configuration than the similar device shown in U.S. Application Ser. No. 614,207, Sealing Member for Valve Stems, filed on Sept. 17, 1975 by E. F. Schoeneweis and Leonard J. Stephens. The body 12 has a peripheral shoulder 52 around the top of the bore 14 and the plug 18 includes a flared top section 54 adjacent the shoulder 52. The top section 54 and shoulder 52 have opposed surfaces 56 and 58, respectively, thereon which inwardly converge toward a space 60 between the bore 14 and the plug 18 above the first circumferential sealing means 22. A resilient sealing ring 62 encircles the plug 18 and normally compressively engages the opposed surfaces 56 and 58 to prevent ingress of foreign material into the space 60. Should the first sealing means 22 fail, fluid pressure in the space 60 would be limited as the sealing ring 62 would be outwardly deflected to allow its escape.

While there has been shown a preferred embodiment of the invention, it should be apparent that various elements or materials might be altered without departing from the scope of the invention as claimed. For example, it can be seen that the plug might be a tapered plug rather than a cylindrical plug as shown in the figures. It would also be possible, for example, to axially relocate the rod-channel configuration at any number of locations along the plug while still providing the desired plug retention.

What is claimed is:

1. A plug valve comprising: a valve body having a bore extending therethrough and a pair of passages interconnecting said bore and being substantially normal to an axis of said bore; a valve plug disposed within said bore for selective rotation between an opened and a closed position to respectively align and misalign a port through said plug with said passages; circumferential sealing means between said plug and said bore being axially located between said port and a set of adjacent ends of said plug and said bore; an insert means resiliently engaging said end of said bore to enclose said end of said plug within said bore to define a space between said end of said plug and said insert means for limiting fluid pressure within said space from acting on said end of said plug if said sealing means should fail by allowing release of said fluid pressure to the exterior of said body and for preventing ingress of foreign matter into said space; said insert means including a plastic bottom portion and an integral tubular extension which extends from said bottom portion in a direction away from said port, said extension extending along an interior surface of said bore and being slightly flared outwardly to make resilient contact with said interior surface of said bore; said tubular extension including an outwardly extending annular shoulder engaging said body around said bore to limit insertion of said insert means into said bore; and means for retaining said insert means within said bore including a peripheral portion of said annular shoulder being joined to said body around said bore at a plurality of circumferentially spaced locations.

* * * * *